US008787286B2

(12) United States Patent
Fredericks et al.

(10) Patent No.: US 8,787,286 B2
(45) Date of Patent: Jul. 22, 2014

(54) METHOD AND APPARATUS FOR ADMITTING A REQUEST FOR ALLOCATION OF WIRELESS CONNECTION RESOURCES IN A COMMUNICATION SYSTEM

(75) Inventors: Robert A. Fredericks, Carol Stream, IL (US); Anatoly Agulnik, Deerfield, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 219 days.

(21) Appl. No.: 13/364,870

(22) Filed: Feb. 2, 2012

(65) Prior Publication Data

US 2013/0201922 A1    Aug. 8, 2013

(51) Int. Cl.
*H04W 72/04*    (2009.01)

(52) U.S. Cl.
USPC ......................................................... 370/329

(58) Field of Classification Search
USPC ........... 370/230, 329, 395, 468, 477; 455/512
See application file for complete search history.

(56) References Cited

U.S. PATENT DOCUMENTS

| 7,783,316 | B1 | 8/2010 | Mitchell |
| 7,937,068 | B2 | 5/2011 | Hogberg et al. |
| 2009/0247204 | A1* | 10/2009 | Sennett et al. ................. 455/512 |
| 2009/0247205 | A1* | 10/2009 | Sennett et al. ................. 455/512 |
| 2009/0253435 | A1 | 10/2009 | Olofsson et al. |
| 2010/0113050 | A1 | 5/2010 | Cheng et al. |
| 2010/0238798 | A1 | 9/2010 | Ahuja et al. |
| 2011/0044198 | A1 | 2/2011 | Persson et al. |
| 2011/0249645 | A1* | 10/2011 | Spinar et al. ................... 370/329 |
| 2011/0294435 | A1 | 12/2011 | Miller et al. |
| 2011/0305137 | A1* | 12/2011 | Chu et al. ....................... 370/230 |
| 2012/0120892 | A1* | 5/2012 | Freda et al. .................... 370/329 |
| 2012/0127942 | A1* | 5/2012 | Cook et al. ..................... 370/329 |
| 2012/0157144 | A1* | 6/2012 | Stanforth et al. .............. 455/512 |

FOREIGN PATENT DOCUMENTS

WO    2011035939 A1    3/2011

OTHER PUBLICATIONS

PCT International Search Report Dated Jul. 23, 2013 for Counterpart Application PCT/US2013/024076.
The Public Safety Nationwide Interoperable Broadband Network: A New Model for Capacity, Performance and Cost FCC White Paper, Jun. 2010; 37 Pages.
Donny Jackson "A Challenging Equation", Jul. 1, 2011; 2 Pages.
Marques, P., "Exploiting the TV White Spaces in Europe: The COGEU System Approach," COGEU Collaborative Paper, 23 pages.

* cited by examiner

*Primary Examiner* — Chirag Shah
*Assistant Examiner* — Jael Ulysse
(74) *Attorney, Agent, or Firm* — Steven A. May

(57) ABSTRACT

A method and apparatus for admitting requests for allocation of bandwidth in a communication system is provided herein. During operation, available bandwidth is logically divided for use among commercial users and public-safety users, where the commercial users utilize a predefined portion of the bandwidth and the public-safety users utilize a public-safety portion of the bandwidth. When a public-safety bearer request is made, and available bandwidth does not exist within the public safety portion of the bandwidth, some bandwidth unoccupied by commercial users from commercial portion can be used to admit the bearer request. When commercial bandwidth is occupied by commercial users, lower priority commercial users can be preempted so that commercial bandwidth can be used to handle the bearer request. In a similar manner, the public-safety portion of available bandwidth can temporarily be used by commercial users.

11 Claims, 6 Drawing Sheets

US 8,787,286 B2

METHOD AND APPARATUS FOR ADMITTING A REQUEST FOR ALLOCATION OF WIRELESS CONNECTION RESOURCES IN A COMMUNICATION SYSTEM

FIELD OF THE INVENTION

The present invention generally relates to admitting a request for allocation of wireless connection resources, and more particularly to a method and apparatus for admitting a request for allocation of wireless connection resources in a communication system.

BACKGROUND OF THE INVENTION

Modern wireless networks are architected in such a way that all nodes (e.g., user equipment (UE), public-safety radios, cellular telephones, . . . etc.) that are connected to the same point-of-attachment (e.g., a BS sector) draw from the same pool of available wireless connection resources. In situations where public safety users and commercial users share a same bandwidth block, some of the available bandwidth will be reserved for commercial use and some of the available bandwidth will be reserved for public safety use. In some cases however, when the need for public safety bandwidth increases (e.g., natural disaster, police activity, etc.), bandwidth may be "borrowed" from commercial use.

With the above in mind, it becomes necessary for an efficient mechanism for public-safety users to "borrow" bandwidth from commercial users, when needed. Therefore, a need exists for a method and apparatus for admitting a request for allocation of wireless connection resources in a communication system that allows public safety users to efficiently borrow bandwidth from commercial users, when needed.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above mentioned need, a method and apparatus for admitting requests for allocation of bandwidth in a communication system is provided herein. During operation, available bandwidth is logically divided for use among commercial users and public-safety users, where the commercial users utilize a predefined portion of the bandwidth and the public-safety users utilize a public-safety portion of the bandwidth. When a public-safety bearer request is made, and available bandwidth does not exist within the public safety portion of the bandwidth, some bandwidth unoccupied by commercial users from commercial portion can be used to admit the bearer request. When commercial bandwidth is occupied by commercial users, lower priority commercial users can be preempted so that commercial bandwidth can be used to handle the bearer request. In a similar manner, the public-safety portion of available bandwidth can temporarily be used by commercial users.

The technique described above will provide an efficient mechanism for public-safety users to "borrow" bandwidth from commercial users, when needed. It should be noted, that if there is sufficient bandwidth to admit the request, using the above technique results in the allocation of bandwidth to higher-priority public-safety users without the need to preempt public-safety users having a lower priority than the requestor in order to handle the request.

Figure 1:
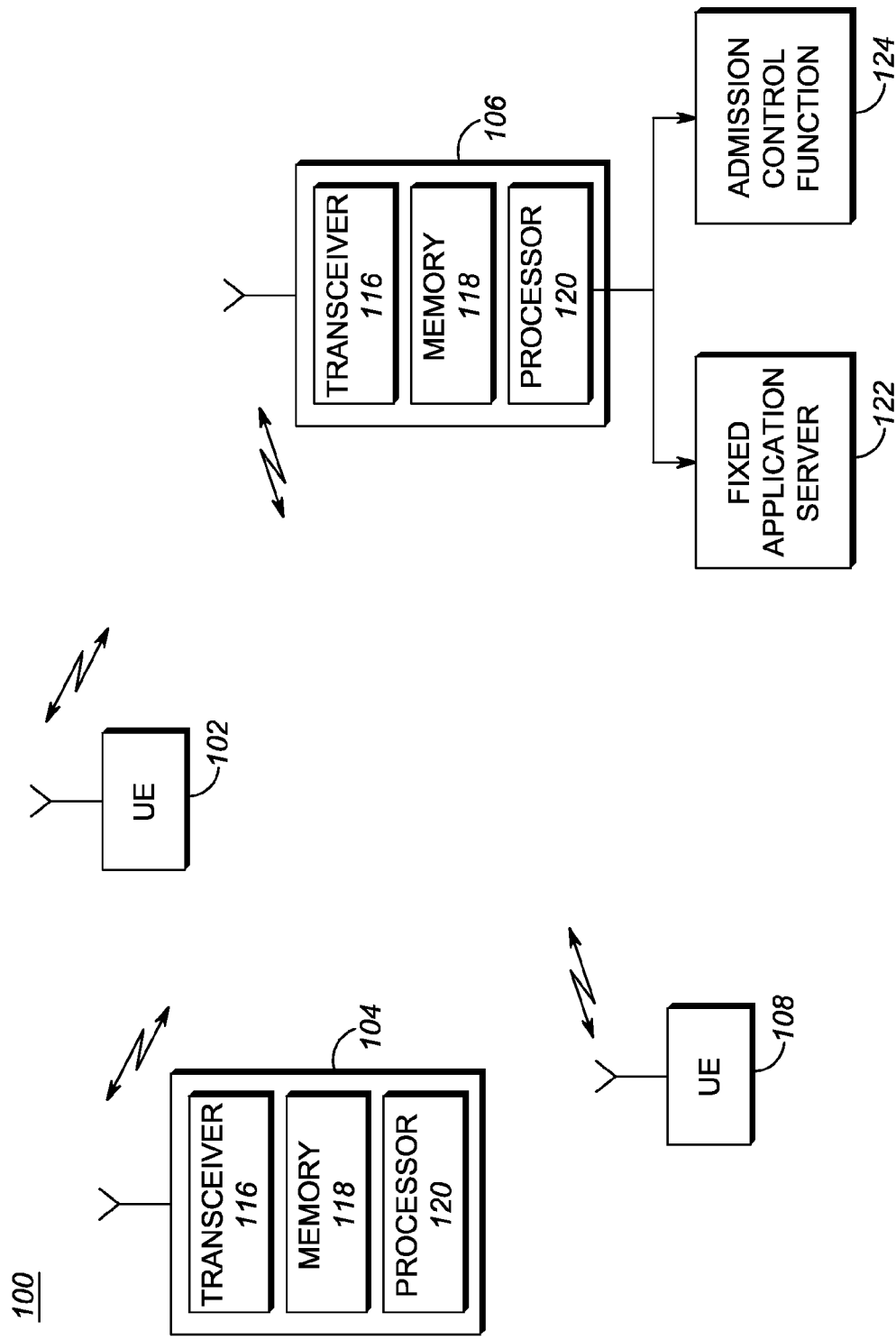
FIG. 1 is block diagram of a communication system.

Turning now to the drawings, wherein like numerals designate like components, FIG. 1 shows a block diagram of a communication system 100 in accordance with an illustrative embodiment. Communication system 100 is depicted in a generalized manner. For example, system 100 is illustrated as comprising a single infrastructure communication device 106 (e.g., a BS), three wireless communication devices 102, 104, and 108 (e.g., UEs), an admission control function 124, and fixed application servers 122 for ease of illustration. However, the teachings herein can be implemented in a system having additional infrastructure communication devices, wireless communication devices, admission control functions, and/or fixed application servers.

Each infrastructure communication device and wireless communication device is at least equipped with a transceiver (i.e., transmitter and receiver apparatus) 116, a memory 118, and a processing device 120, and is further equipped with any additional components as needed for a practical embodiment. The transceivers, memories, and processing devices can have any suitable physical implementation and are topologically coupled depending on the particular device implementation. These components are further operatively coupled and can be adapted, arranged, configured, and designed to perform methods in accordance with the teachings herein, for example, as illustratively described by reference to the remaining figures. Transceivers, memories, and processing devices are at least configured for applications (computer readable instructions) to exist on memory that are executed by processing devices which support admittance of bearers and allocation of wireless connection resources between an infrastructure communication device 106 and wireless communication devices 102, 104, and 108.

As referred to herein, a wireless communication device includes, but is not limited to, devices commonly referred to as access terminals, mobile radios, mobile stations, subscriber units, user equipment (UE), mobile devices, or any other device capable of operating in a wireless environment. Examples of wireless communication devices include, but are not limited to, two-way radios, mobile phones, cellular phones, smart phones, tablets, Personal Digital Assistants (PDAs), mobile data terminals (MDT), laptops and two-way pagers. Applications executing on wireless communication devices 102, 104, and 108 may transfer data with applications executing on other wireless communication devices 102, 104, and 108, or with applications residing on a fixed application server 122. Wireless communication devices 102, 104, and 108 may also request bearer reservations from admission control function 124.

Additionally, communication devices 102, 104, and 108 comprise either public-safety devices, commercial devices, or a combination of public-safety and commercial devices. During operation, available bandwidth is divided for use among commercial users and public-safety users, where the commercial users primarily utilize a commercial portion of the bandwidth and the public-safety users primarily utilize a public-safety portion of the bandwidth. It should be noted that the term "portion" may be thought of as an "amount" of bandwidth, and not necessarily particular physical bandwidth (e.g., the bandwidth existing between 5 and 15 MHz). Thus, the commercial portion may comprise 50% of the bandwidth, and the public-safety portion may comprise another 50% of the bandwidth. For example, device 102 may comprise a public-safety device such as a public-safety radio that primarily communicates using a first portion of the available bandwidth, while devices 104 and 108 may comprise commercial devices such as cellular telephones that utilize the commercial portion of the bandwidth.

As used herein, an infrastructure communication device 106 is a device that is a part of a fixed network infrastructure and can receive information (either control or media, e.g., data, voice (audio), video, etc.) via wireless signals from one or more wireless communication devices and transmit information via wireless signals to one or more wireless communication devices via a wireless connection. An infrastructure communication device includes, but is not limited to, equipment commonly referred to as repeaters, base radios, base stations (BS), evolved Node Bs (eNB), base transceiver stations, access points, or any other type of infrastructure equipment interfacing with one or more wireless communication devices. The infrastructure communication device schedules and proxies transmissions of data streams between wireless communication devices and/or fixed application server 122.

System 100 also includes an admission control function 124 which interfaces with an infrastructure communication device 106, wireless communication devices 102, 104, and 108, and a fixed application server 122. The admission control function receives bearer reservation requests from applications residing on either a fixed application server or on wireless communication devices. The admission control function processes such requests and may admit, deny, preempt, and revoke bearers as appropriate. In some network implementations, such as the 3GPP LTE standard, the functionality of the admission control function, as described herein, may be distributed across the Mobility Management Entity (MME), the Broadcast Multicast Service Center (BM-SC), the Policy and Charging Rules Function (PCRF), or an eNB. In other embodiments, the functionality of the admission control function may be distributed between various shown and omitted system elements, inclusive of the infrastructure communication device 106. Those skilled in the art will also appreciate that any number of intermediate processing entities (not shown) may exist between admission control function 124 and the entities to which it interfaces.

Fixed application server 122 (e.g., a video server) transmits and receives data streams to and from applications executing on wireless communication devices via the infrastructure communication device. Fixed application server 122 also requests bearer reservations from the admission control function.

In this illustrative embodiment, system 100 is a broadband wireless data system, and the infrastructure communication device 106 and the wireless communication devices 102, 104, and 108 communicate in accordance with any standard or proprietary wireless communication protocol that allows for communication of data, including, but not limited to, IEEE 802.11, IEEE 802.16, Long Term Evolution (LTE), Universal Mobile Telecommunication System (UMTS), Evolved-Data Optimized (EVDO), or other communication network technologies employing adaptive modulation techniques. The infrastructure communication device 106 is hereinafter referred to as a base station (BS), and wireless communication devices 102, 104, and 108 are hereinafter referred to as user equipment (UE). In accordance with the LTE standard, the BS is typically referred to as an enhanced Node B (eNB).

A typical communication session comprises transmission of data streams from the BS to the UEs (downlink) and from the UEs to the BS (uplink). The UEs in system 100 communicate with the BS via wireless connections. A wireless connection, as used herein, is a wireless communication channel between 1 BS and at least 1 UE, comprising an allocation of wireless connection resources in the downlink, uplink, or both directions, and can be initiated by either a BS or a UE. The wireless connections comprise allocations of radio bandwidth. An allocation of radio bandwidth is shared between one or more operating UEs by partitioning it using multiple access techniques well known in the art. Examples of such techniques include Code Division Multiple Access (CDMA), Time Division Multiple Access (TDMA), Orthogonal Frequency Division Multiplexing (OFDM), and variants thereof.

Figure 2:
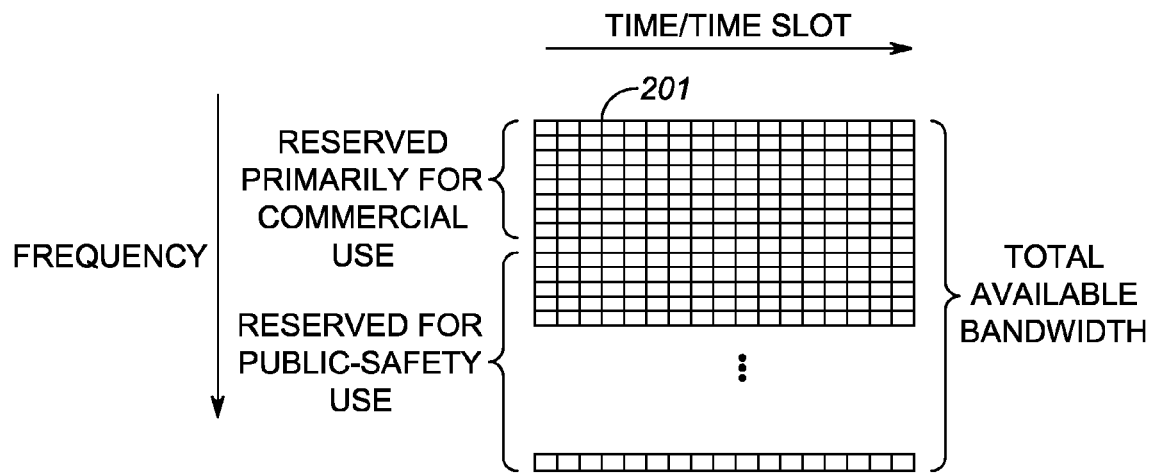
FIG. 2 illustrates wireless connection resources in an OFDM-based communication system.

For illustrative purposes, wireless connection resources are explained here in the context of a 3GPP LTE system. It is understood, however, that communication system 100 and more generally the teachings of this invention need not be limited to the technologies embodied by the LTE standard. As one of ordinary skill in the art will recognize, LTE utilizes OFDM-based multiple access techniques. As shown in FIG. 2, OFDM partitions radio bandwidth into a plurality of radio frequency (RF) subcarriers (frequency bands) with each RF subcarrier further partitioned into time-based sub-frames. In the context of LTE, a wireless connection resource, as used herein, is an allocation of a subcarrier for a given sub-frame (i.e., a resource block). During operation of an OFDM-based system, one or more subcarriers are assigned or scheduled to transmit a given data stream over a certain number of sub-frames. Each base station has a finite amount of wireless connection resources (i.e., resource blocks), limited by the amount of allocated radio bandwidth, which it may allocate to bearer reservations for data transmission.

As is evident, a first portion of the total bandwidth is reserved primarily for commercial use, while a second portion of the available bandwidth is reserved for public-safety use. While FIG. 2 illustrates the reserved portions existing in a particular manner, one of ordinary skill in the art will recognize that any portion of the available bandwidth may be reserved for either commercial or public-safety use.

In order to address the aforementioned issue, a modified admission control function 124 is provided herein. In addition to the other considerations known in the art, the admission control function 124 allows an efficient mechanism for public-safety users to "borrow" bandwidth from commercial portion, when needed. The technique utilized by admission control function 124 results in allocation of bandwidth to higher-priority public-safety users without the need to preempt public-safety users having a lower priority when unoccupied bandwidth is allocated from the commercial portion of bandwidth.

There exist only a finite number of wireless connection resources available for bearer reservations for data transmission to or from UEs in a given sector of base station 106. As discussed above, in situations where public safety users and commercial users share a same bandwidth block, in some cases, when the need for public safety bandwidth increases (e.g., natural disaster, police activity, etc.), bandwidth may be "borrowed" from commercial use. In order to address this issue, admission and control function 124 will use bandwidth from the commercial bandwidth in order to satisfy public-safety bandwidth needs. More particularly, each bearer request has an associated priority. When a public-safety bearer request is received, and public-safety bandwidth is unavailable to handle the request, admission and control function 124 will determine if any existing (i.e. actively communicating) lower-priority public-safety bearers have a lower priority than the bearer request. If so, then unlike prior art systems, the lower-priority public-safety bearers are not preempted. Instead, if available, commercial bandwidth is used to handle the request. If commercial bandwidth needed to handle the request is occupied, existing commercial users are analyzed by function 124 to determine if any of the commercial users have a lower priority than the lower-priority public-safety bearers. If so, those existing commercial users are preempted, and their bandwidth used to handle the request.

Figure 3:
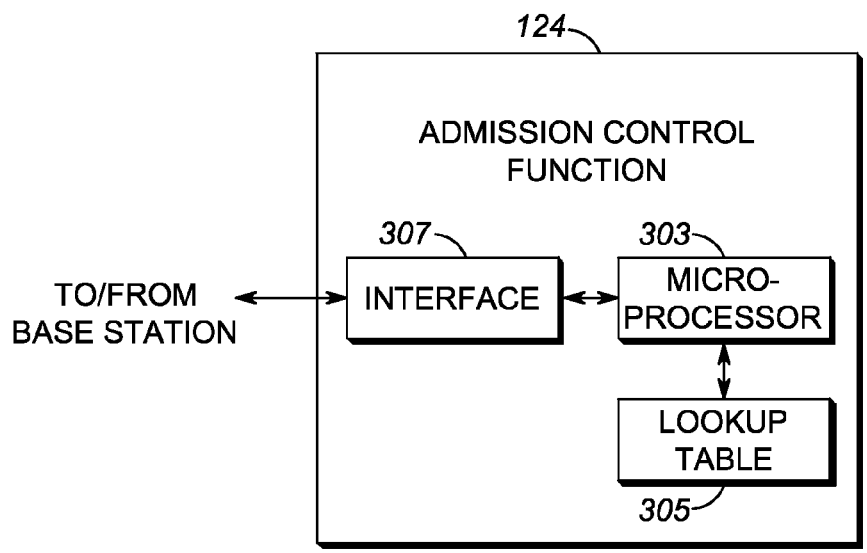
FIG. 3 is a block diagram of an admission control function within the communication system of FIG. 1.

FIG. 3 is a block diagram showing admission control function 124. As shown, admission control function 124 comprises logic circuitry 303 (microprocessor 303), an interface 307, and a lookup table 305. Logic circuitry 303 preferably comprises a microprocessor controller, such as, but not limited to, a digital signal processor (DSP), general purpose central processing unit (CPU), a programmable logic device (PLD), or application specific integrated circuit (ASIC) and is utilized to process bearer reservation requests in accordance with the invention disclosed herein. The admission control function 124 uses interface 307 to communicate with base stations 106 and applications running on both fixed application server 122 and UEs 102, 104, and 108. As previously noted, the functionality of the admission control function may be embodied in an infrastructure processing device such as a PCRF, or in a base station 106, or divided between two or more such entities. Finally, lookup table 305 is provided to store associated priorities for bearers allocated by the system. Lookup table 305 preferably comprises standard random access memory. During operation, admission control function 124 will:

receive a bearer request from a public-safety device;
admit the bearer request using public-safety bandwidth if enough public-safety bandwidth is available to handle the request;
use commercial bandwidth to handle the request when there is not enough public-safety bandwidth available, and there exists sufficient unused commercial bandwidth available to handle the request.

When there is insufficient public-safety resources available to handle the public-safety bearer request, and there is insufficient commercial resources available to handle the request (i.e., public-safety users and commercial users are utilizing the necessary bandwidth), then admission control function 124 will perform the following steps:

determine if existing lower-priority public-safety bearers exist;
if lower-priority public-safety bearers exist, determine if any commercial users have a lower priority than the lower-priority public-safety bearers, and if so, preempt the commercial users having the lower priority and use their bandwidth to satisfy the public-safety bearer request.

When a situation exists where there exist no lower-priority existing public-safety bearers than the priority of the requestor, and insufficient public-safety bandwidth is available to handle the request, then admission control function 124 will perform the following steps:

determine if any commercial users have a lower priority than the requestor;
if so, preempt the commercial user(s) having the lower priority and use their bandwidth to satisfy the public-safety bearer request.
if not, deny the bearer request.

It should be noted that there may be situations where many commercial users have a lower priority than the requesting public-safety bearer. In this situation not all lower-priority commercial users are preempted. Admission control function 124 will only preempt enough commercial users to satisfy the bandwidth requirements of the requestor.

It should also be noted that the term "preempt" may not necessarily mean the termination of an existing bearer. Instead, an existing bearer may be preempted by simply adjusting the quality of service (i.e., bandwidth) of the existing bearer downward in order to free up available resources to handle the bearer request.

It should also be noted that communication system 100 utilizes a two-tiered priority system, with commercial users competing among commercial users for bandwidth based on their priority, and public-safety users competing among public-safety users for bandwidth. Two independent priority schemes exist: one for public-safety bandwidth and the other for commercial bandwidth. For public safety requests to compete with commercial bearers their priorities are converted into equivalent commercial priorities based on predefined mapping by using a table that exists in table 305. Higher-priority public-safety users may include users such as emergency responders, while lower-priority public-safety users may include users such as routine (non-emergency) video surveillance. In a similar manner, higher-priority commercial users may include those users dialing emergency numbers, as opposed to those simply placing non-emergency calls. With the above in mind, there may exists situations where commercial uses have a higher priority than public-safety users. For example, an agency may wish to invoke a policy which prevents emergency commercial calls from being preempted by routine (non-emergency) public-safety bearer requests.

Figure 4:
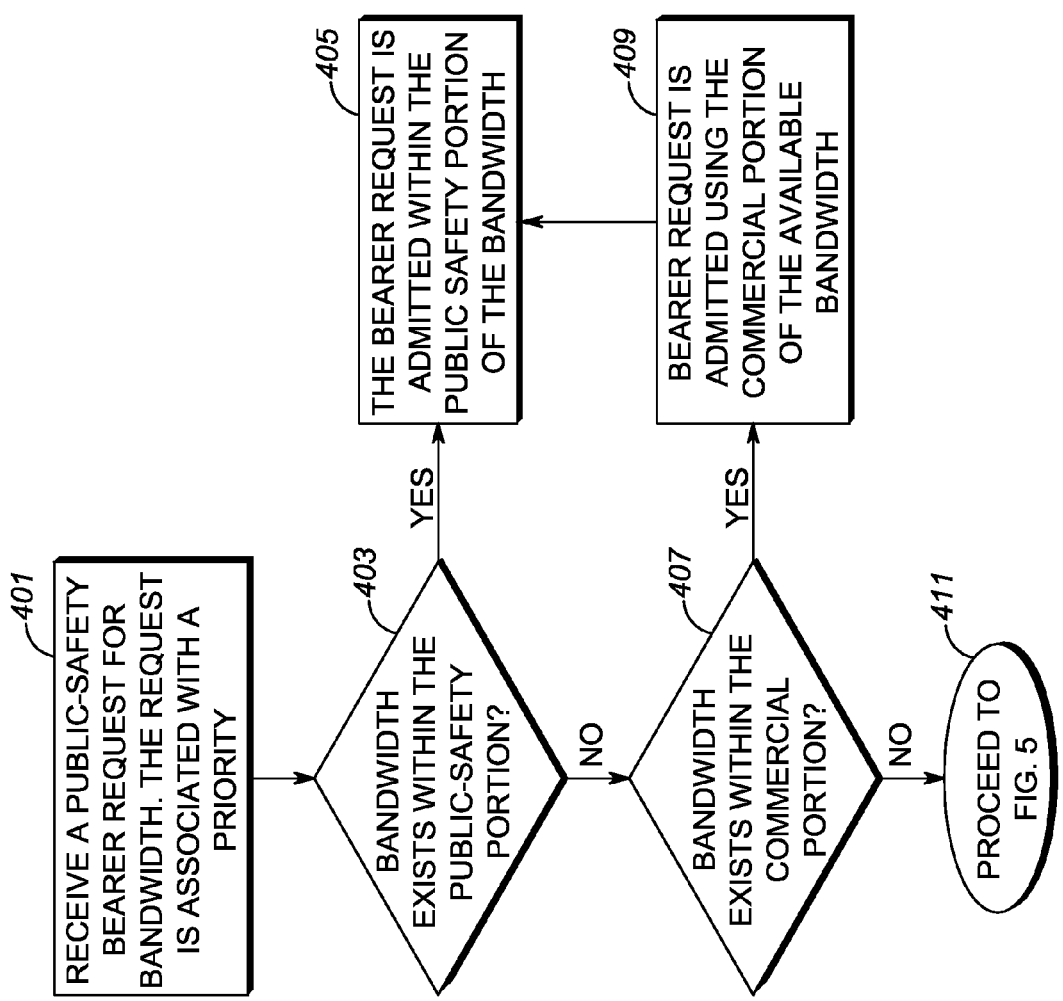
FIG. 4 is a flow chart showing operation of the admission control function of FIG. 3.

FIG. 4 is a flow chart showing operation of admission control function 124. The logic flow begins at step 401 where interface 307 receives a public-safety bearer request for bandwidth. The request is associated with a priority. As discussed above, bandwidth is shared between commercial users and public-safety users, where the commercial users primarily utilize a commercial portion of the bandwidth and the public-safety users primarily utilize a public-safety portion of the bandwidth. At step 403 a determination is made by logic circuitry 303 whether the requested bandwidth exists within the public-safety portion of the bandwidth, and if so, the logic flow continues to step 405 where the bearer request is admitted within the public safety portion of the bandwidth. Thus, when sufficient bandwidth exists within the public-safety portion of the bandwidth, the bearer request will be admitted using the public-safety portion of the bandwidth.

When sufficient bandwidth does not exist within the public-safety portion of the bandwidth, the logic flow continues to step 407 where logic circuitry 303 determines if the requested bandwidth exists within the commercial portion of the bandwidth. If so, then the bearer request is admitted using the commercial portion of the bandwidth (step 409). Thus, when sufficient bandwidth exists within the commercial portion of the bandwidth and does not exist within the public-safety portion of the bandwidth, then the bearer request is admitted using the commercial portion of the bandwidth.

When the logic flow hits step 411, sufficient bandwidth does not exist within the commercial portion of the bandwidth and does not exist within the public-safety portion of the bandwidth. The steps taken in this situation are illustrated in FIG. 5.

Figure 5:
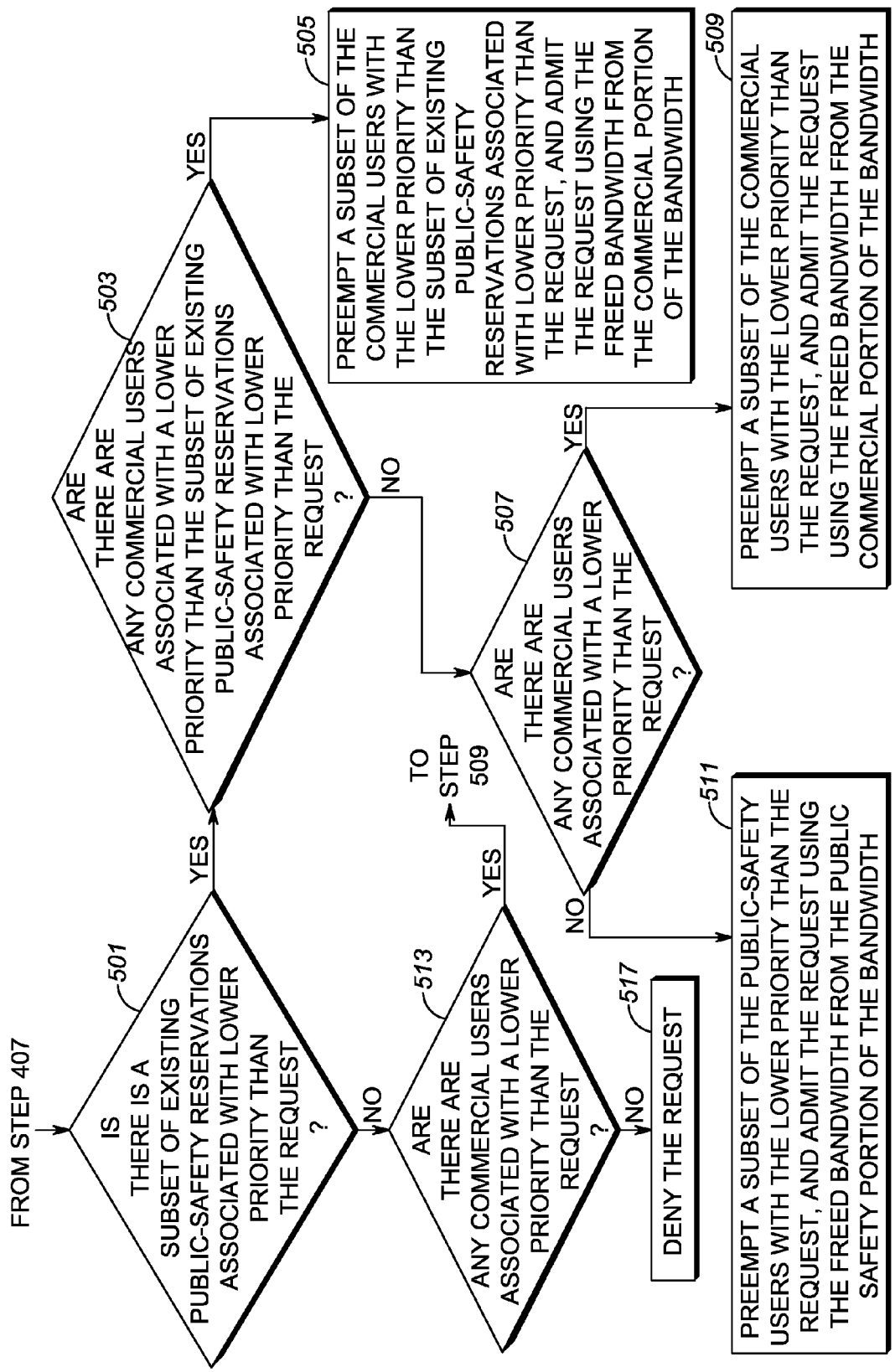
FIG. 5 is a flow chart showing operation of the admission control function of FIG. 3 when sufficient bandwidth for a public-safety bearer request does not exist within the commercial portion of the bandwidth and does not exist within the public-safety portion of the bandwidth.

FIG. 5 is a flow chart showing operation of the admission control function of FIG. 3 when sufficient bandwidth for a public-safety bearer request does not exist within the commercial portion of the bandwidth and does not exist within the public-safety portion of the bandwidth. The logic flow begins at step 501 where logic circuitry 303 determines if there is a subset of existing public-safety reservations associated with lower priority than the request. If not, the logic flow continues to step 513.

When the subset of lower priority public-safety reservations exists and sufficient bandwidth does not exist within the commercial portion of the bandwidth and does not exist within the public-safety portion of the bandwidth, then the logic flow continues to step 503 where logic circuitry 303 determines if there are any commercial users associated with a lower priority than the subset of existing public-safety reservations associated with lower priority than the request. As discussed above, this step entails the conversion of public safety priorities into equivalent commercial priorities based on predefined mapping by using a table that exists in table 305.

If, at step 503 it is determined that there are commercial users associated with a lower priority than the subset of existing public-safety reservations associated with lower priority than the request, the logic flow continues to step 505. Once step 505 is reached, there are existing public-safety users with a lower priority than the requestor and commercial users with a lower priority than the existing public-safety users having the lower priority than the requestor. Thus, logic circuitry 303 preempts a subset of the commercial users with the lower priority than the subset of existing public-safety reservations associated with lower priority than the request, admits the request using the freed bandwidth from the commercial portion of the bandwidth.

If, at step 503 it is determined that there are no commercial users associated with a lower priority than the subset of existing public-safety reservations associated with lower priority than the request, the logic flow continues to step 507 where logic circuitry 303 determines if there are any commercial users associated with a lower priority than the request. If so, the logic flow continues to step 509.

Once step 509 is reached, there are existing public-safety users with a lower priority than the requestor, no commercial users with a lower priority than the existing public-safety users having the lower priority than the requestor, and commercial users with lower priority than the requestor. Thus, logic circuitry 303 preempts a subset of the commercial users with the lower priority than the request and admits the request using the freed bandwidth from the commercial portion of the bandwidth.

Returning to step 507, if at step 507 logic circuitry 303 determines that there are no commercial users associated with a lower priority than the request, the logic flow continues to step 511. Once step 511 is reached there are existing public-safety users with a lower priority than the request, no commercial users with a lower priority than the existing lower priority public-safety users, and no commercial users with a lower priority than the request. Thus, at step 511, logic circuitry 303 preempts a subset of the existing public-safety users with the lower priority than the request, and admits the request using the freed bandwidth from the public-safety portion of the bandwidth.

Returning to step 513, if there is no subset of existing public-safety reservations associated with lower priority than the request, the logic flow continues to step 517. Once step 517 is hit, there are no existing public-safety users with a lower priority than the request, and no commercial users with a lower priority than the request. Therefore, at step 517, logic circuitry does not admit the bearer request.

Although the above description was given with public-safety bearer requests attempting to preempt commercial users, one of ordinary skill in the art will recognize that commercial bearer requests may preempt public safety spectrum in a similar manner.

Figure 6A:
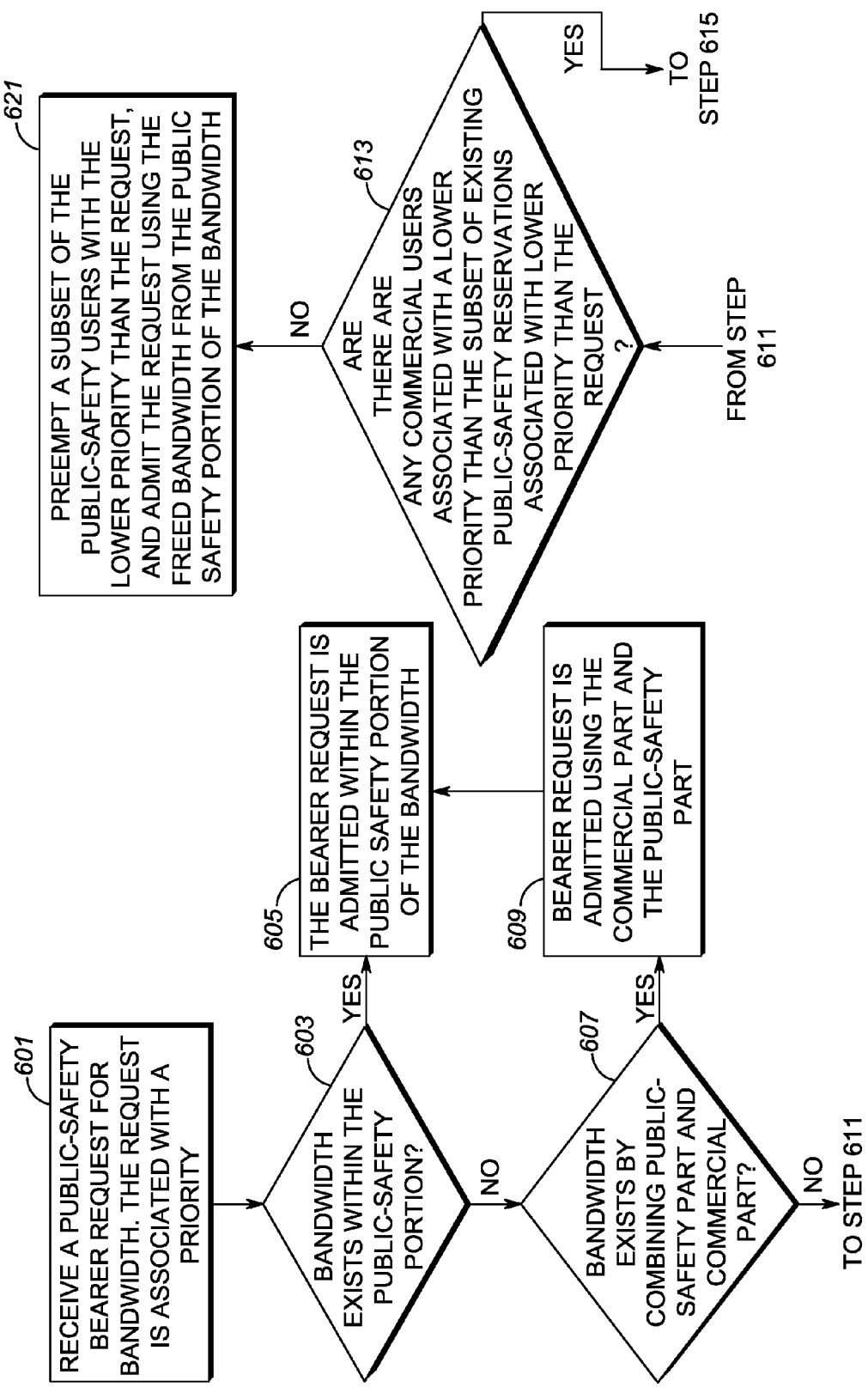
FIG. 6 is a flow chart showing operation of the admission control function of FIG. 3 when sufficient bandwidth for a public-safety bearer request does not exist within the commercial portion of the bandwidth and does not exist within the public-safety portion of the bandwidth.
Figure 6B:
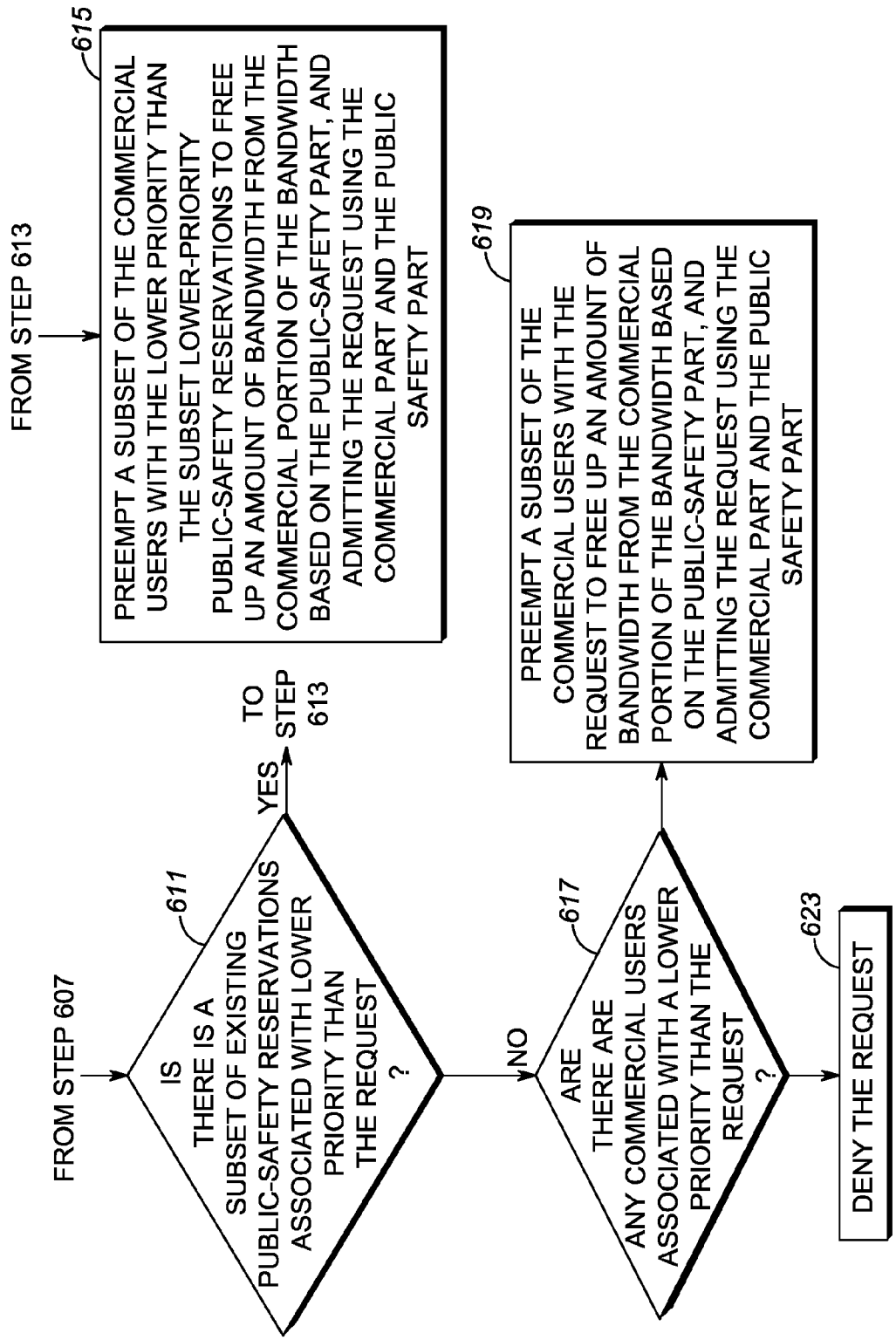

It should be noted that when a bearer request for bandwidth is received by admission and control function 124, function 124 may procure a portion of the requested bandwidth from the public-safety portion of the bandwidth and a portion of the requested bandwidth from the commercial portion of the bandwidth. For example, assume that a public-safety request is for five units of bandwidth, however, only two units of bandwidth exists within the public-safety portion of the bandwidth. In that case, only three units may be procured from the commercial portion of the bandwidth. The request for bandwidth will then be granted using two units of bandwidth from the public-safety portion of the bandwidth and three units of bandwidth from the commercial portion of the bandwidth. This is illustrated in FIG. 6, where a flowchart showing operation of the admission control function of FIG. 3. More particularly, the logic flow of FIG. 6 illustrates a method for admitting a request for allocating bandwidth for a public-safety user in a communication system where bandwidth is shared between commercial users and public-safety users, wherein the commercial users primarily utilize a commercial portion of the bandwidth and the public-safety users primarily utilize a public-safety portion of the bandwidth, the public-safety portion of the bandwidth comprises a public-safety part that is unused, and the commercial portion of the bandwidth comprises a commercial part that is unused. Both the public-safety part and the commercial part are unused by any device.

The logic flow begins at step 601 where interface 307 receives a request for a bearer reservation for bandwidth. The request is associated with a priority. At step 603 logic circuitry 303 determines if the requested bandwidth exists within the public-safety portion of the bandwidth and if so the bearer request is admitted using the public-safety portion of the bandwidth. (step 605).

When sufficient bandwidth does not exist within the public-safety portion of the bandwidth (i.e., the public-safety part is not large enough to handle the request), then logic circuitry 303 determines if the requested bandwidth exists by combining the public-safety part of the bandwidth and the commercial part of the bandwidth (step 607). When logic circuitry 303 determines that a combination of the public-safety part and the commercial part is enough to satisfy the request, then the request is admitted using the commercial part and the public-safety part of the bandwidth (step 609). It should be noted that the public-safety part may comprise zero bandwidth, with all the bandwidth coming from the commercial part.

When logic circuitry 303 determines that sufficient bandwidth does not exist by combining a commercial part and a public-safety part of the bandwidth then logic circuitry 303 determines if there is a subset of existing public-safety reservations having a lower priority than the request (lower-priority public-safety reservations) (step 611), and if so the logic flow continues to step 613.

When step 613 is reached, the subset of lower priority public-safety reservations exists and sufficient bandwidth does not exist by combining the commercial part and the public-safety part of the bandwidth. When this is the case, logic circuitry 303 determines if there are any commercial users having a lower priority than the subset of lower-priority public-safety reservations (step 613) and if so logic circuitry 303 preempts a subset of the commercial users with the lower priority than the subset lower-priority public-safety reservations to free up an amount of bandwidth from the commercial portion of the bandwidth based on the public-safety part, and admitting the request using the commercial part and the public safety part (step 615).

When step 617 is reached the subset of lower priority public-safety reservations does not exist and sufficient bandwidth does not exist by combining the commercial part and the public-safety part of the bandwidth. When this is the case, logic circuitry 303 determines if there are any commercial users associated with a lower priority than the request, and preempts a subset of the commercial users with the lower priority than the request to free up an amount of bandwidth from the commercial portion of the bandwidth based on the public-safety part, and admitting the request using the commercial part and the public safety part(step 619).

Returning to step 613, if at step 613 it is determined that there are no commercial users associated with a lower priority than the subset of existing public-safety reservations associated with lower priority than the request, then the logic flow continues to step 621 where the subset of existing public-safety reservations associated with the lower priority are preempted to fulfill the request Returning to step 617, if it is determined that there are no commercial users with lower priority than the request, the logic flow continues to step 623. When step 623 is reached the public-safety part and the commercial part are insufficient to satisfy the request. Additionally, there are no lower-priority public-safety users, nor are there any lower-priority commercial users. When this is the case. the request is denied.

It should be noted that there may exist a situation where the public-safety part and the commercial part are not enough to satisfy a request, and both public-safety users and commercial users may need to be preempted to satisfy the request. In this scenario, there will exist lower-priority public-safety users, however, not enough lower-priority public-safety users to satisfy the request if they are preempted. Because of this, the preemption of the lower-priority public-safety users may still not free up enough bandwidth to satisfy the request. Thus, lower-priority commercial users may need to be preempted as well. The lower-priority commercial users will have a priority that is lower than the preempted public-safety users, and lower than the priority of the request.

Thus, with the above in mind, when the subset of lower priority public-safety reservations does exist and sufficient bandwidth does not exist by combining the commercial part and the public-safety part of the bandwidth, then a determination can be made if there are any commercial users associated with a lower priority than the request, and a subset of the public-safety and commercial users can be preempted with the lower priority than the request to free up an amount of bandwidth from the public-safety portion of the bandwidth based on the public-safety part and commercial part, and the request can be admitted using the commercial part and the public safety part.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for admitting a request for allocating bandwidth for a public-safety user in a communication system where bandwidth is shared between commercial users and public-safety users, wherein the commercial users primarily utilize a commercial portion of the bandwidth and the public-safety users primarily utilize a public-safety portion of the bandwidth, the method comprising the steps of:
receiving, via an interface, a request for a bearer reservation for bandwidth, wherein the request is associated with a priority;
determining if the requested bandwidth exists within the public-safety portion of the bandwidth;
admitting the bearer request using the public-safety portion of the bandwidth when sufficient bandwidth exists within the public-safety portion of the bandwidth;
determining if the requested bandwidth exists within the commercial portion of the bandwidth when sufficient bandwidth does not exist within the public-safety portion of the bandwidth;
admitting the bearer request using the commercial portion of the bandwidth when sufficient bandwidth exists within the commercial portion of the bandwidth and does not exist within the public-safety portion of the bandwidth;
determining if there is a subset of existing public-safety reservations having a lower priority than the request (lower-priority public-safety reservations) when sufficient bandwidth does not exist within the commercial portion of the bandwidth and does not exist within the public-safety portion of the bandwidth;
determining if there are any commercial users having a lower priority than the subset of lower-priority public-safety reservations when the subset of lower priority public-safety reservations exists and sufficient bandwidth does not exist within the commercial portion of the bandwidth and does not exist with the public-safety portion of the bandwidth, then preempting a subset of the commercial users with the lower priority than the subset lower-priority public-safety reservations, and admitting the request using the freed bandwidth from the commercial portion of the bandwidth;
determining if there are any commercial reservations associated with a lower priority than the request when the subset of lower priority public-safety reservations does not exist and sufficient bandwidth does not exist within the commercial portion of the bandwidth and does not exits within the public-safety portion of the bandwidth, then preempting a subset of those commercial reservations with a lower priority than the request, and admitting the request using freed bandwidth from the commercial portion of the bandwidth.

2. The method of claim 1 further comprising the steps of:
admitting the request by preempting the lower-priority public-safety reservations when sufficient bandwidth does not exist within the commercial portion or the public-safety portion of the bandwidth to handle the request, and lower-priority public-safety reservations exist, and no commercial users associated with a lower priority than the request, and no commercial users have a lower priority than the subset of lower-priority public-safety reservations.

3. The method of claim 2 further comprising the steps of:
denying the public-safety request when sufficient bandwidth does not exist within the commercial portion or the public-safety portion of the bandwidth to handle the request, and lower-priority public-safety reservations do not exist, and no commercial users associated with a lower priority than the request, and no commercial users have a lower priority that the subset of lower-priority public-safety reservations, then.

4. A method for admitting a request for allocating bandwidth for a public-safety user in a communication system where bandwidth is shared between commercial users and public-safety users, wherein the commercial users primarily utilize a commercial portion of the bandwidth and the public-safety users primarily utilize a public-safety portion of the bandwidth, the public-safety portion of the bandwidth comprises a public-safety part that is unused, and the commercial portion of the bandwidth comprises a commercial part that is unused, the method comprising the steps of:

receiving, via an interface, a request for a bearer reservation for bandwidth, wherein the request is associated with a priority;

determining if the requested bandwidth exists within the public-safety portion of the bandwidth;

admitting the bearer request using the public-safety portion of the bandwidth when sufficient bandwidth exists within the public-safety portion of the bandwidth;

determining if the requested bandwidth exists by combining the public-safety part of the bandwidth and the commercial part of the bandwidth when sufficient bandwidth does not exist within the public-safety portion of the bandwidth;

admitting the bearer request using the commercial part and the public-safety part of the bandwidth when a combination of the public-safety part and the commercial part is enough to satisfy the request, then;

determining if there is a subset of existing public-safety reservations having a lower priority than the request (lower-priority public-safety reservations) when sufficient bandwidth does not exist by combing a commercial part and a public-safety part of the bandwidth then;

determining if there are any commercial users having a lower priority than the subset of lower-priority public-safety reservations when the subset of lower priority public-safety reservations exists and when sufficient bandwidth does not exist by combing the commercial part and the public-safety part of the bandwidth then, preempting a subset of the commercial users with the lower priority than the subset lower-priority public-safety reservations to free up an amount of bandwidth from the commercial portion of the bandwidth based on the public-safety part and commercial part, and admitting the request using the commercial part and the public safety part.

5. The method of claim 4 determining if there are any commercial users associated with a lower priority than the request when the subset of lower priority public-safety reservations does not exist and sufficient bandwidth does not exist by combing the commercial part and the public-safety part of the bandwidth, and preempting a subset of the commercial users with the lower priority than the request to free up an amount of bandwidth from the commercial portion of the bandwidth based on the public-safety part and commercial part, and admitting the request using the commercial part and the public safety part.

6. The method of claim 4 determining if there are any commercial users associated with a lower priority than the request when the subset of lower priority public-safety reservations does not exist and sufficient bandwidth does not exist by combing the commercial part and the public-safety part of the bandwidth, and if no commercial users associated with the lower priority than the request exists, then denying the request.

7. The method of claim 4 determining if there are any commercial users associated with a lower priority than the request when the subset of lower priority public-safety reservations does not exist and sufficient bandwidth does not exist by combing the commercial part and the public-safety part of the bandwidth, and if not, preempting a subset of the public-safety users with the lower priority than the request to free up an amount of bandwidth from the public-safety portion of the bandwidth based on the public-safety part and commercial part, and admitting the request using the commercial part and the public safety part.

8. The method of claim 4 determining if there are any commercial users associated with a lower priority than the request when the subset of lower priority public-safety reservations does exist and sufficient bandwidth does not exist by combing the commercial part and the public-safety part of the bandwidth, and preempting a subset of the public-safety and commercial users with the lower priority than the request to free up an amount of bandwidth from the public-safety portion of the bandwidth based on the public-safety part and commercial part, and admitting the request using the commercial part and the public safety part.

9. An apparatus for admitting a request for allocating bandwidth for a public-safety user in a communication system where bandwidth is shared between commercial users and public-safety users, wherein the commercial users primarily utilize a commercial portion of the bandwidth and the public-safety users primarily utilize a public-safety portion of the bandwidth, the public-safety portion of the bandwidth comprises a public-safety part that is unused, and the commercial portion of the bandwidth comprises a commercial part that is unused, the apparatus comprising:

an interface receiving a request for a bearer reservation for bandwidth, wherein the request is associated with a priority;

logic circuitry performing the steps of:

determining if the requested bandwidth exists within the public-safety portion of the bandwidth;

admitting the bearer request using the public-safety portion of the bandwidth when sufficient bandwidth exists within the public-safety portion of the bandwidth;

determining if the requested bandwidth exists by combining the public-safety part of the bandwidth and the commercial part of the bandwidth when sufficient bandwidth does not exist within the public-safety portion of the bandwidth;

admitting the bearer request using the commercial part and the public-safety part of the bandwidth when a combination of the public-safety part and the commercial part is enough to satisfy the request;

determining if there is a subset of existing public-safety reservations having a lower priority than the request (lower-priority public-safety reservations) when sufficient bandwidth does not exist by combing a commercial part and a public-safety part of the bandwidth;

determining if there are any commercial users having a lower priority than the subset of lower-priority public-safety reservations when the subset of lower priority public-safety reservations exists and when sufficient bandwidth does not exist by combing the commercial part and the public-safety part of the bandwidth, then preempting a subset of the commercial users with the lower priority that the subset lower-priority public-safety reservations to free up an amount of bandwidth from the commercial portion of the bandwidth based on the public-safety part, and admitting the request using the commercial part and the public safety part.

10. The apparatus of claim 9 wherein the logic circuitry determines if there are any commercial users associated with a lower priority than the request when the subset of lower priority public-safety reservations does not exist and sufficient bandwidth does not exist by combing the commercial part and the public-safety part of the bandwidth, and preempts a subset of the commercial users with the lower priority than the request to free up an amount of bandwidth from the commercial portion of the bandwidth based on the public-safety part, and admits the request using the commercial part and the public safety part.

11. The apparatus of claim 9 wherein the logic circuitry determines if there are any commercial users associated with a lower priority than the request when the subset of lower priority public-safety reservations does not exist and sufficient bandwidth does not exist by combing the commercial part and the public safety part of the bandwidth, and if not, denies the request.

* * * * *

UNITED STATES PATENT AND TRADEMARK OFFICE
CERTIFICATE OF CORRECTION

PATENT NO. : 8,787,286 B2  Page 1 of 1
APPLICATION NO. : 13/364870
DATED : July 22, 2014
INVENTOR(S) : Robert A. Fredericks et al.

It is certified that error appears in the above-identified patent and that said Letters Patent is hereby corrected as shown below:

IN THE SPECIFICATION:

In Column 1, Line 45, delete "is" and insert -- is a --, therefor.

In Column 6, Line 24, delete "request." and insert -- request; --, therefor.

In Column 8, Line 63, delete "bandwidth." and insert -- bandwidth --, therefor.

In Column 9, Line 47, delete "request" and insert -- request. --, therefor.

In Column 9, Line 54, delete "case." and insert -- case, --, therefor.

IN THE CLAIMS:

In Claim 1, Column 12, Line 22, delete "with the" and insert -- within the --, therefor.

In Claim 1, Column 12, Line 33, delete "exits" and insert -- exist --, therefor.

In Claim 3, Column 12, Line 57, delete "public-safety reservations, then." and insert -- public-safety reservations. --, therefor.

In Claim 4, Column 13, Line 17, delete "is enough to satisfy the request, then;" and insert -- is enough to satisfy the request; --, therefor.

In Claim 4, Column 13, Line 22, delete "public-safety part of the bandwidth then;" and insert -- public-safety part of the bandwidth; --, therefor.

In Claim 4, Column 13, Lines 28 - 29, delete "part of the bandwidth then, preempting" and insert -- part of the bandwidth, then preempting --, therefor.

Signed and Sealed this
Seventh Day of June, 2016

Michelle K. Lee
*Director of the United States Patent and Trademark Office*